June 28, 1949.  A. L. STONE  2,474,556
PIPE JOINT SEAL
Filed Nov. 23, 1945
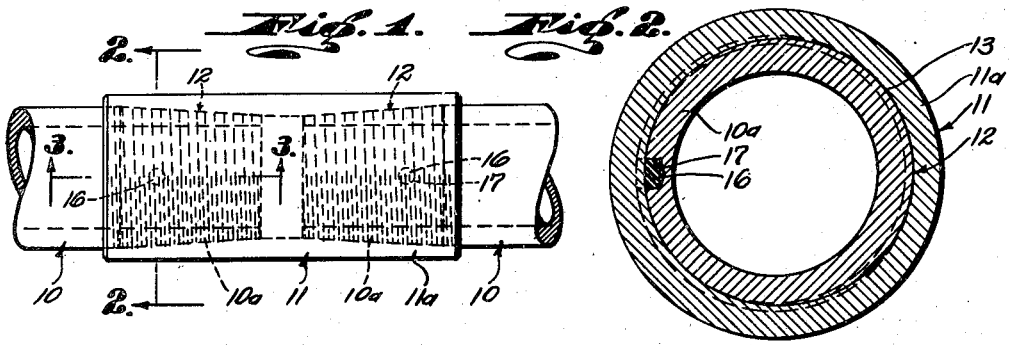
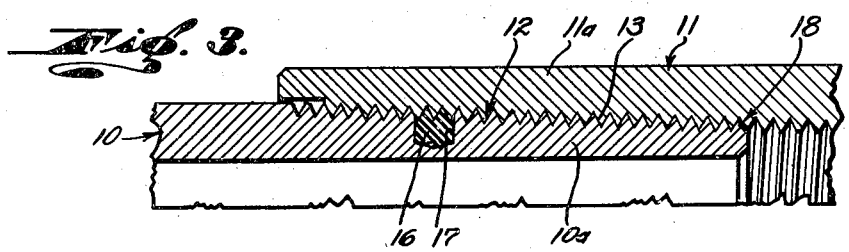
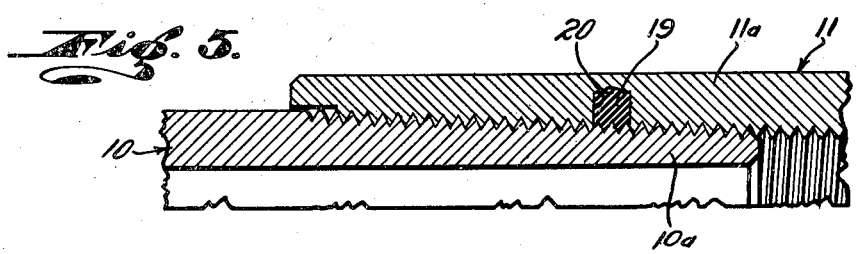
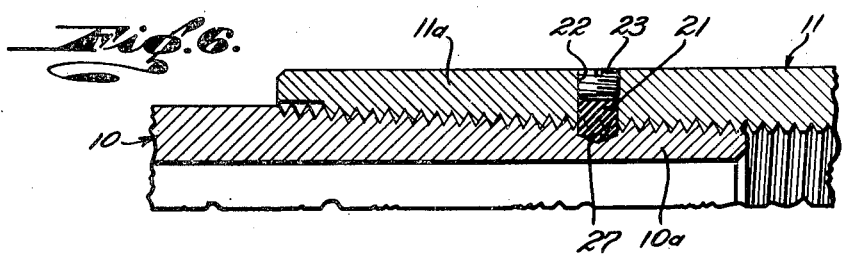
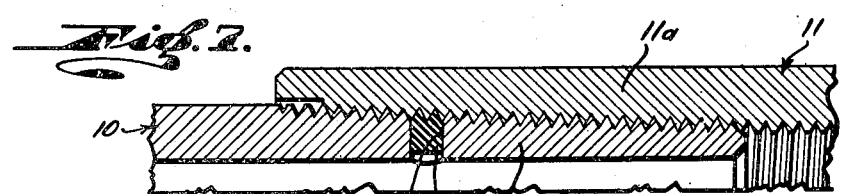
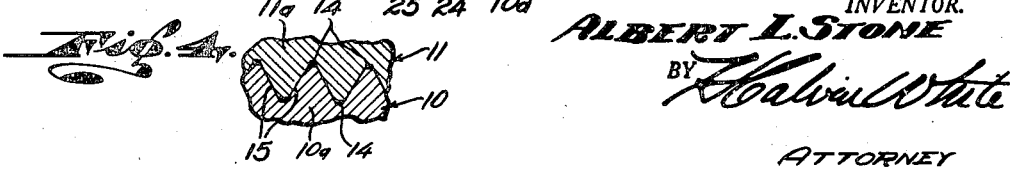
INVENTOR.
ALBERT L. STONE
BY *Halvin White*
ATTORNEY Patented June 28, 1949

2,474,556

UNITED STATES PATENT OFFICE 2,474,556

PIPE JOINT SEAL

Albert L. Stone, Palos Verdes Estates, Calif.

Application November 23, 1945, Serial No. 630,196

2 Claims. (Cl. 285—154)

This invention has to do generally with the sealing of threaded pipe joints against fluid leakage, and has for its general object to provide an improved seal characterized by its extreme simplicity and practicability, and capacity for use without to any appreciable degree weakening or otherwise interfering with the normal or desired structural requirements of the joint.

The invention has been developed especially for sealing threaded well pipe joints, particularly casing joints, and as will hereinafter appear, embodies and takes into consideration various features and requirements of casing joints. Accordingly, the invention will be described particularly, though typically in certain general aspects, as embodied in that kind of threaded joint.

Heretofore it has been proposed to seal well pipe and other joints by the use of annular deformable sealing elements or materials, either preformed or put into the joint in fluid condition, and intended to effect the seal by presenting an annular barrier to fluids tending to leak through the threads. In some instances the seal has been located beyond the threads, while other expedients contemplate inserting the seal in the interengaged thread area of the joint.

A general practice thus has been to present a deformable ring barrier against an annular side of which fluid pressure is exerted to press the seal material against the side or sides of the threads. And in adapting the joint for the seal, one of the joint sections has been weakened to provide an annular recess to accommodate the seal annulus.

In accordance with the invention, the joint seal is effected on a different principle making possible its reduction to a simple and practicable form which obviates the usual weakening of the joint structure. It is found that an effective seal can be maintained by presenting a localized dam transversely across the thread course, as distinguished from a barrier coextensive with the annular course of the threads. Accordingly, the invention contemplates placing within one section and the interengaging thread area of the joint, an insert of suitable deformable sealing material, such as any of the soft sealing metals, plastics or rubbers, which fully occupies all spaces that may exist between the threads at that location and therefore presents a fluid tight dam across the spiral course of such spaces.

Particular consideration has been given the applicability of the seal to standard API, V-thread well casing joints which as commonly made up, contain flowable sealing compounds intended to minimize fluid leakage through the joint, under the commonly encountered high pressures by filling clearance spaces beyond the thread crests and any spaces that may exist between the flanks of the threads. One particular function of the present sealing dam is to present a barrier against displacement of the sealing compound through the thread clearances and thereby enable the joint to retain the maximum quantity and extent of the sealing compound. In this connection it is particularly contemplated according to a preferred practice, that the seal be located within the threads last to interengage as the joint is made up, so that the wiping action of the seal will displace the sealing compound along only a small extent of the threads, leaving the compound within the major course of the thread clearances.

Further details of the invention and more complete understanding of the aforementioned features and objects will be had from the following description of certain illustrative embodiments shown by the accompanying drawing, in which:

Fig. 1 is an exterior view intended to illustrate a standard API, V-thread casing joint;

Fig. 2 is an enlarged cross-section on line 2—2 of Fig. 1;

Fig. 3 is an enlarged fragmentary section taken on line 3—3 of Fig. 1 illustrating a preferred embodiment of the invention;

Fig. 4 is a fragmentary further enlarged section illustrating the thread clearance; and Figs. 5, 6, and 7 are views similar to Fig. 3, illustrating variational forms of the invention.

Referring first to the general view of Fig. 1, the joint assembly comprises the casing sections 10 interconnected by the coupling 11 at the threaded joints 12. The connections may be standard API tapered V-thread joints formed, see Fig. 3, by a tapered course of V-threads 13 on each pin end 10a of the casing, and corresponding threads in each box end 11a of the coupling. The thread shape is illustrated more particularly in Fig. 4. Here it will be observed that because of practical considerations in the formation of the threads, clearances exist at 14 beyond the thread crest and forming spiral channels through which fluid leakage may occur under the influence of pressures inside or outside the casing, the course of the leakage tendency therefor being from right to left in the joint sections shown in Figs. 3 to 7. Imperfections in the thread formation and joint make up may at times leave clearances between the thread flank surfaces 15, thus forming additional channels through which leakage may occur.

As previously indicated, it is present practice to place on the threads before the joint is made up, flow resistant sealing compounds intended to fill all spaces presented by the thread clearances and thereby seal the joint. However, at the higher internal pressures the sealing compound frequently is forced out of the joint through the clearance channels, permitting eroding fluid leakage which in time weakens and opens the joint to excessive leakage.

The invention contemplates insertion within a localized and preferably small circular recess within the interengaging thread area of one of the joint sections 10a or 11a of a deformable seal which, as previously explained, forms a dam across the leakage channel or channels. In accordance with the preferred form of the invention shown in Fig. 3, a body 16 of the sealing material is inserted within a closed end circular recess 17 within the inner or pin section 10a. Preferably the sealing material 16 is bonded to the metallic wall of the recess 17 as for example by vulcanizing a rubber insert directly to the metal. It will be observed that the seal insert is most conveniently accommodated within the pin section 10a since the surface of the latter is more directly accessible for drilling the recess and inserting the seal.

In its formation and placement within the recess, the seal insert 16 may be set into the pipe in substantially the form of a cylindrical plug, the outer surface of which projects just slightly beyond the crest of the pin threads 13, or a distance such that thereafter the seal material will fully occupy the channels 14 in the box end 11a. Thread segments then may be cut or otherwise formed in the outer face of the seal for alined engagement with the box section threads, the size of the thread segments on the seal being sufficient to assure complete closure of any leakage channels between the threads. It will be observed that in Fig. 3 the seal is located within and near the ends of the threads last to interengage as the joint is made up. Accordingly, with the joint spaces 14 filled with the sealing compound, the seal 16 wipes and displaces the compound from only a small extent of the total interengaging thread course as the sections are screwed together, leaving the spaces 14 completely filled with the compound throughout the spiral course of the threads from the seal 16 to the inner end 18 of the joint. Tendency for fluid leakage out through the joint thus is effectively resisted by the presence of the sealing compound and the dam which the seal 16 places across the channels 14 to arrest any flow of the sealing compound.

In Fig. 5 the seal 19 composed and formed as previously described with reference to the seal 16, is shown to be bonded within a circular recess 20 in the outer joint section 11a. As will be understood, the seal may be placed at any desired location longitudinally of the joint.

The embodiment of Fig. 6 is similar except that here the seal 21 is contained within a bore 22 extending radially through the wall of a coupling and containing a threaded plug 23 which may be turned against the insert to press and maintain it in fluid-tight engagement with the pin threads. This construction further permits insertion of the sealing element within the joint in made up condition. The seal 21 may take the form of a plug having thread segments formed on its inner face in a manner corresponding to the sealing element 19 in Fig. 5, or it may be extended as specifically illustrated to extend across and through both the pin and box threads into a recess 27 in the pin section, thus forming a dam extending through the thread channels 14 and sealed at its ends and outside by pressed engagement with the plug 23, the bottom of recess 27, and the sides of the bore 22 and recess 27. This form of seal may be preferred where high external pressures tend to produce fluid leakage from the outside of the casing through the joint. By making up or tightening the joint before insertion of the sealing element 21, the aforementioned sealing compound may be contained within the thread clearance throughout the entire extent of the threads, and under the circumstances, to particular benefit at the left or outside of the seal. By then applying the seal, the latter imposes a dam against displacement of the sealing compound occupying the full course of the thread clearances between the seal and the external thread run out. When the joint is to be broken, the sections may be unscrewed, shearing off the seal plug at the thread interface, a new seal to be inserted when the joint is again made up.

In Fig. 7 the seal 24 is shown to be contained within a bore 25 extending radially through the inner section 10a and to be exposed at its inner end to the pressure inside the casing. The sealing element thus is rendered responsive to the internal fluid pressure, so that as the pressure increases the element is forced more tightly into sealing engagement with the box section threads.

I claim:

1. A threaded pipe joint comprising inner and outer sections having inter-engaging threads and spiral fluid-containing clearance spaces beyond the crests of the threads that form fluid-passing channels containing a flowable sealing substance, and a body of deformable material contained within a recess in a portion only of the annular threaded area of one of the sections and having its inner face in sealing engagement with opposed threads and channels on the other section, said deformable material forming a dam across said channels so as to seal the joint against fluid leakage therethrough and to crowd said flowable sealing substance forward in said spaces as the sections are screwed together, the crowded flowable sealing substance between the deformable member and the inner end of the joint coacting with the deformable member to prevent fluid leakage out through the joint.

2. A threaded pipe joint comprising inner and outer sections having inter-engaging threads and spiral fluid-containing clearance spaces beyond the crests of the threads that form fluid-passing channels containing a flowable sealing substance, and a body of deformable material contained within a recess in a portion only of the annular threaded area of one of the sections and having its inner face in sealing engagement with opposed threads and channels on the other section, said deformable material being non-metallic and having elastic qualities and forming a dam across said channels so as to seal the joint against fluid leakage therethrough and to crowd said flowable sealing substance forward in said spaces as the sections are screwed together, the crowded flowable sealing substance between the deformable member and the inner end of the joint coacting with the deformable member to prevent fluid leakage out through the joint.

ALBERT L. STONE.

REFERENCES CITED

The following references are of record in the file of this patent:

UNITED STATES PATENTS

| Number | Name | Date |
|---|---|---|
| 2,087,185 | Dillon | July 13, 1937 |
| 2,179,202 | Simpson | Nov. 7, 1939 |

FOREIGN PATENTS

| Number | Country | Date |
|---|---|---|
| 1,657 | Denmark | June 13, 1898 |